April 14, 1931. G. GIDDO 1,800,935
DIMMER FOR HEADLIGHTS
Filed Oct. 29, 1929
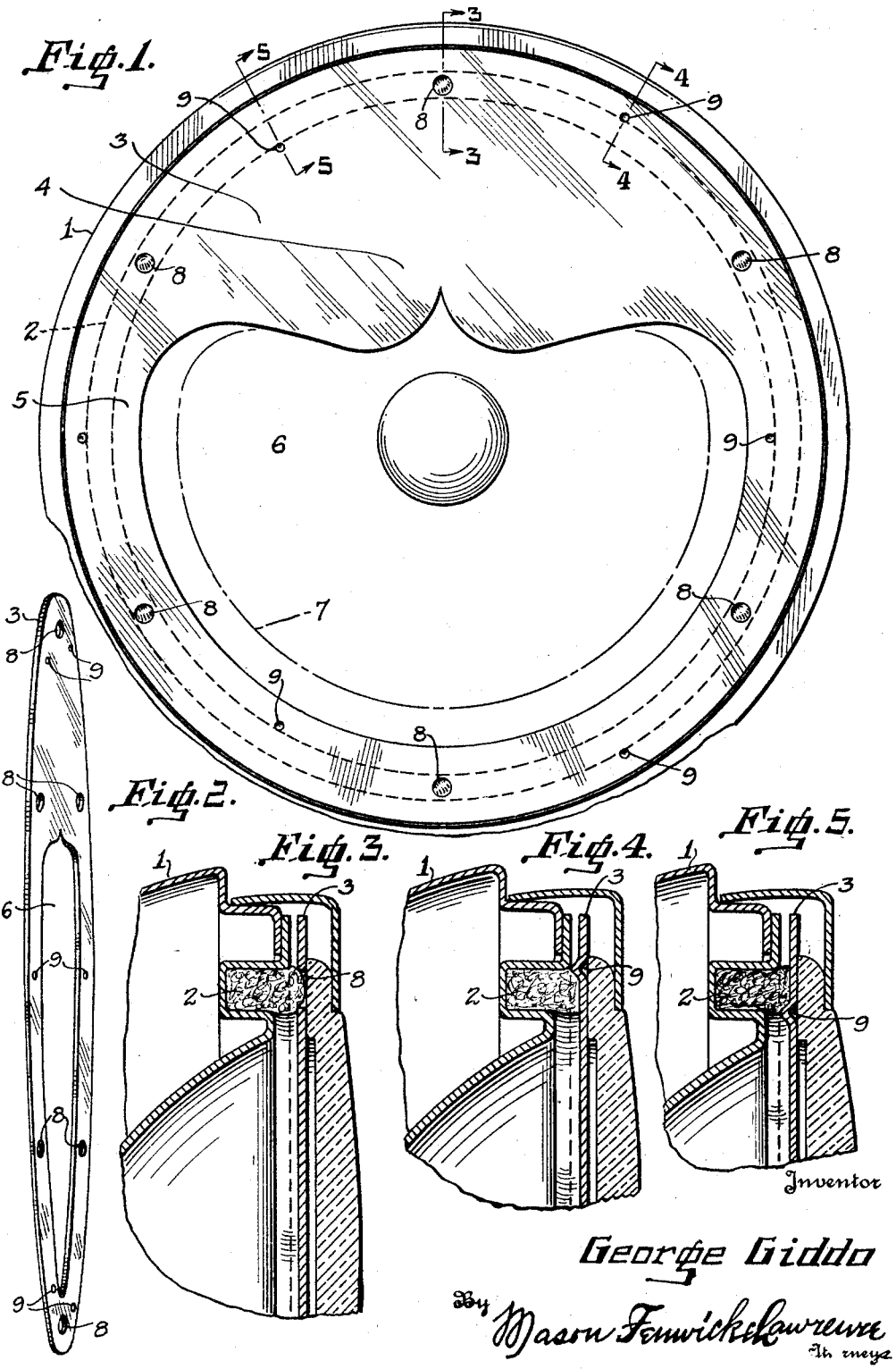
Inventor
George Giddo
By Mason Fenwick Lawrence
Attorneys Patented Apr. 14, 1931

1,800,935

UNITED STATES PATENT OFFICE

GEORGE GIDDO, OF KINGSTON, PENNSYLVANIA

DIMMER FOR HEADLIGHTS

Application filed October 29, 1929. Serial No. 403,266.

My invention relates to improvements in dimmers for headlights of automobiles.

In my construction, I avoid the necessity of any auxiliary attaching means, or the necessity of changing the construction of the body of the headlight in order to secure the dimmer in position.

In the accompanying drawings:

Figure 1 is a front elevation of the headlight of an automobile with my dimmer attached thereto and with the rim and lense removed;

Figure 2 is a perspective view of the transparent dimmer detached from the headlight;

Figure 3 is a section along the line 3—3 of Figure 1, through an aperture or hole provided in the attaching rim of the dimmer, in which the packing arranged around the edge of the reflector, is forced when the dimmer is in position on the headlight;

Figure 4 is a section on the line 4—4 in Figure 1, through one of the beads provided in the dimmer for engaging the packing in the headlight; and Figure 5 is a vertical section along the line 5—5 in Figure 1 of another bead provided in the dimmer for engaging the packing in the headlight; the successive beads around the edge of the dimmer being arranged in a staggered manner to engage opposite faces of the packing.

1 in the drawings represents a headlight of standard construction, which is provided with the usual packing 2 extending around the outer edge of the reflector.

3 represents my improved dimmer, which consists of a transparent disk constructed preferably of celluloid, having a main body portion 4 forming the dimmer portion, and a securing flange 5 with an opening or space 6 between the dimmer portion 4 and the attaching flange portion 5.

This opening may be of any desired shape to permit the light from the headlight to penetrate clearly therethrough.

The attaching edge of the dimmer may be of sufficient width to extend beyond the outer rim so as to be seen through the lense as at 7 in Figure 1 for decorative purposes, and also to reduce the size of the field of the lense through which the light of the lamp penetrates. The extent of the projection of the attaching edge beyond the rim of the headlight may vary, and it may be plain or fanciful, as desired.

Around the edge of the transparent dimmer, I provide a plurality of openings 8 which fall in line with the packing 2 of the headlight so that when the transparent dimmer is placed in position on the headlight beneath the glass carried by the rim and the rim forced into position, the packing will be caused to enter the holes 8 and prevent the dimmer from rotating.

The edge of the transparent dimmer is also provided with beads 9 which are preferably arranged between the openings 8, in a staggered manner so as to impinge upon the inner and outer edges of the packing 2, thereby holding the dimmer in alignment and preventing any up and down movement of the same.

As it will be readily understood, my dimmer consists of a single piece of transparent material, preferably celluloid, which can be readily and quickly stamped out with the beads and holes formed therein at very slight cost, adapted to be applied to an automobile headlight by simply being laid against the inside of the glass front, so that the beads engage the usual packing and hold it securely in place when the front rim of the headlight is bound in its normal position.

Having now fully described my invention, what I claim as new and desire to secure by Letters Patent is:

A dimmer for the headlight of an automobile, consisting of a single piece of transparent material having a main dimmer body portion at the top, and an annular attaching edge with a space for light from the lamp of the headlight below the dimmer portion, the said attaching edge being provided with a plurality of holes, a plurality of beads arranged between the holes, the holes being arranged to receive a portion of the packing of the headlight and the beads to engage the edge of the packing to prevent any rotary or up and down movement of the dimmer.

In testimony whereof I affix my signature.

GEORGE GIDDO.